Patented Jan. 13, 1931

1,788,372

UNITED STATES PATENT OFFICE

ARNOLD DOSER, OF COLOGNE-MULHEIM, AND ALFRED THAUSS, OF COLOGNE-DEUTZ, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

NEW CONDENSATION RESIN PHENOL PRODUCTS

No Drawing. Original application filed January 28, 1928, Serial No. 250,332, and in Germany February 1, 1927. Divided and this application filed July 11, 1928. Serial No. 292,016.

The present invention concerns new condensation products obtainable from natural resins and phenols and their sulfonated derivatives and a process of preparing same.

According to our invention the new products are prepared by condensing natural resins, for instance, colophony with phenols such as phenol or $\alpha$-naphthol in the presence of aqueous acids, for instance, diluted sulfuric acid, which does not act as a sulfonating agent, for several hours while heating.

The new products are stable compounds from which the phenol cannot be separated by alkali or by steam distillation; they are yellowish to brown colored resinlike substances, insoluble in water, soluble in aqueous alkaline solutions, from which by the addition of acid the condensation product is precipitated again. In the usual organic solvents, such as alcohol, ether, benzene and acetic anhydride they are easily soluble.

By treating them with a sulfonating agent such as sulfuric acid monohydrate, water-soluble sulfonic acids of the condensation products are obtained, which are valuable tanning agents.

The following examples will illustrate our invention, without limiting it thereto, the parts being by weight.

*Example 1.*—A solution of 30 parts of colophony and 13 parts of phenol with the addition of 1.5 parts of sulfuric acid of 60° Bé. are heated to 70–80° C. during 8 hours. From the reaction mass the superfluous phenol is separated by steam distillation. The new compound is a viscous resinlike substance showing no more the Storch-Morawski reaction on colophony; see Zeitschrift für angewandte Chemie 1927, Seite 100.). A solution in acetic anhydride with the addition of a drop of concentrated sulfuric acid gives a reddish coloration. The condensation product is dissolved in carbon tetrachloride and sulfonated with 80 parts of sulfuric acid monohydrate during 4 hours at a temperature of about 10° C. The reaction mass is pressed to form a cake of resin. It is dissolved in hot water and salted out, precipitating in form of brownish flakes, melting together to form a cake on heating.

*Example 2.*—100 parts of colophony and 50 parts of $\alpha$-napththol are melted together at a temperature of 110° C., 2 parts of sulfuric acid of 60° Bé. being added to the melt. Then the temperature is raised to about 120° C. and kept at this temperature for about 8 hours. The reaction product shows no more the presence of unchanged colophony. The melt is dissolved in carbon tetrachloride and sulfonated with 300 parts of sulfuric acid monohydrate at temperatures from 10–15° C. The reaction mass is worked up as described in Example 1.

This is a division of our application Ser. No. 250,332, filed January 28th, 1928.

We claim:

1. The process of preparing new condensation products, which process comprises treating a mixture of a natural resin and a phenol with an aqueous acid and treating the reaction mass with a sulfonating agent.

2. The process of preparing new condensation products, which process comprises treating a mixture of colophony and phenol with diluted sulfuric acid and treating the reaction mass with sulfuric acid monohydrate.

3. The new products obtainable by sulfonating and condensation products from natural resins and phenols, being generally yellowish to brown resinlike substances, in the form of their alkali metal salts soluble in water and being valuable tanning agents.

4. The new product obtainable by treating with sulfuric acid monohydrate the condensation product from colophony and phenol, being a yellowish resinlike substance, in the form of its alkali metal salts soluble in water and being a valuable tanning agent.

In testimony whereof we have hereunto set our hands.

ARNOLD DOSER. [L. S.]
ALFRED THAUSS. [L. S.]